Figure 1:
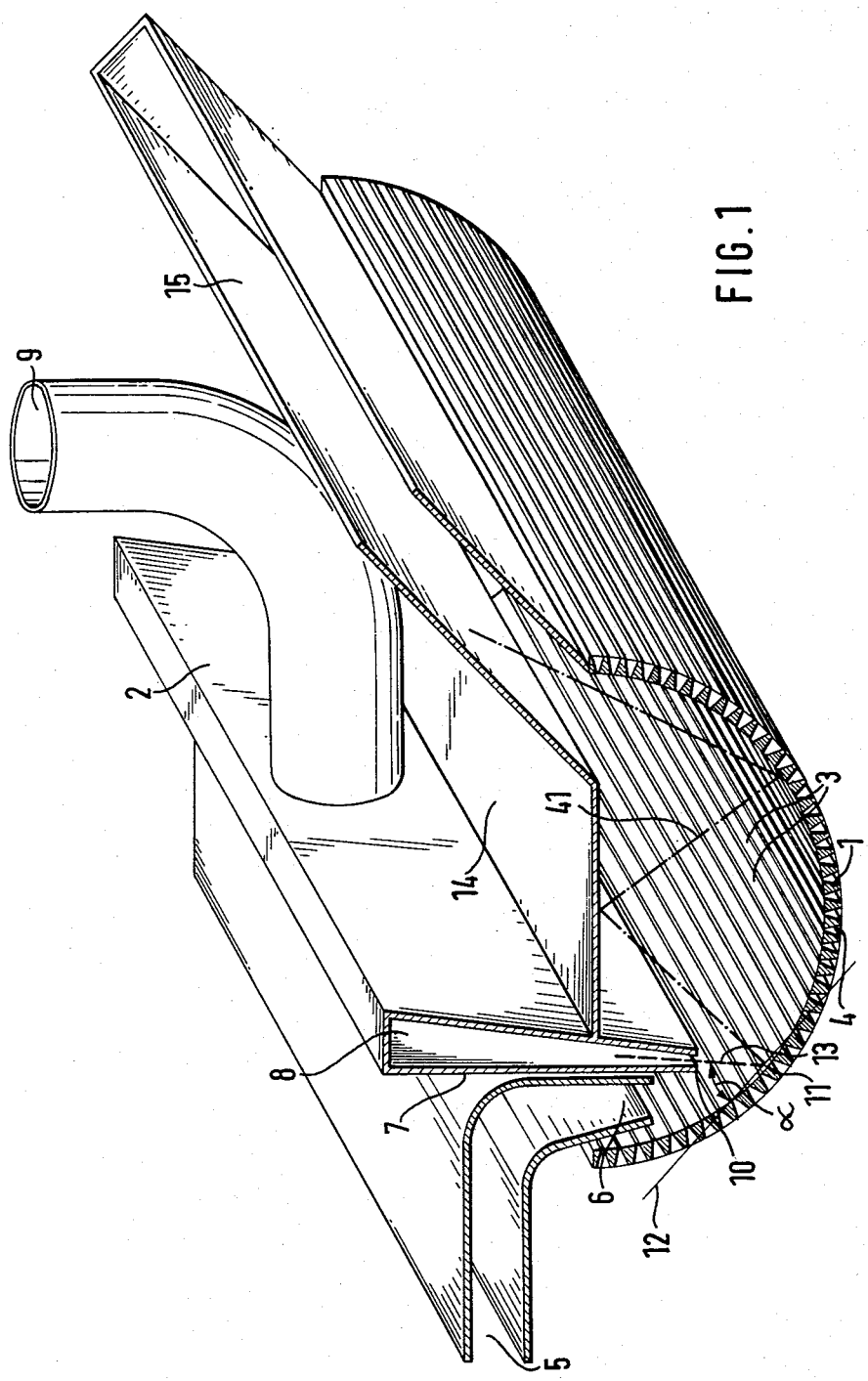

United States Patent [19]

Hench et al.

[11] Patent Number: 4,489,505

[45] Date of Patent: Dec. 25, 1984

[54] DEVICE FOR THE DEHYDRATION AND DRYING OF SOLIDS, ESPECIALLY OF HYDRAULICALLY(UNDERWATER-)GRANULATED PLASTIC MATERIALS

[75] Inventors: Hans Hench, Inzlingen; Horst Lettner, Glattbach; Friedrich Hunke, Grossostheim, all of Fed. Rep. of Germany

[73] Assignee: Automatik Apparate-Maschinenbau H. Hench GmbH, Grossostheim, Fed. Rep. of Germany

[21] Appl. No.: 347,371

[22] Filed: Feb. 9, 1982

[30] Foreign Application Priority Data

Feb. 16, 1981 [DE] Fed. Rep. of Germany ....... 3105609

[51] Int. Cl.³ ............................................ F26B 17/10
[52] U.S. Cl. ................................. 34/57 R; 34/57 C; 34/164; 34/241
[58] Field of Search ............... 34/57 R, 57 C, 164, 34/241, 57 E, 58; 209/281, 250, 380; 210/388, 407

[56] References Cited

U.S. PATENT DOCUMENTS

| 3,797,661 | 3/1974 | Buzga | 210/73 |
| 3,805,401 | 4/1974 | Fontein | 34/58 |
| 4,081,382 | 3/1978 | Buzga | 34/57 E |

FOREIGN PATENT DOCUMENTS

| 2126069 | 7/1974 | Fed. Rep. of Germany . | |
| 249998 | 4/1926 | United Kingdom | 34/57 E |

*Primary Examiner*—Larry I. Schwartz
*Assistant Examiner*—David W. Westphal
*Attorney, Agent, or Firm*—Fleit, Jacobson, Cohn & Price

[57] ABSTRACT

A device for the dehydration and drying of solids, especially granulated plastic materials, in the form of a mixture of granulate and water. Water passes through a curved sieve by an air current that flows in the direction in which the water passes through the sieve and also flows along the sieve. The mixture of granulate and water is delivered to the curved sieve through a delivery channel and whirled, by the energy of the air current, over the curved sieve and conveyed to an outlet duct, at the end of the curved sieve. On the curved sieve, an air jet that runs at an angle to the sieve, is directed for the admission of the air current. The mixture of granulate and water that is carried along by the air current, hits the curved sieve at an angle ranging, approximately between 25° to 75° in relation to the curved sieve. In the direction of flow, behind the air jet, is a cover which covers the curved sieve. The cover is adjacent to the rear wall of the air jet, and extends to the outlet passage. The cover is mounted to guide the granulate executing a shuttling rebound movement between the cover and the curved sieve.

12 Claims, 4 Drawing Figures

DEVICE FOR THE DEHYDRATION AND DRYING OF SOLIDS, ESPECIALLY OF HYDRAULICALLY(UNDERWATER-)GRANULATED PLASTIC MATERIALS

The invention is concerned with a device for the dehydration and drying of solids, especially of hydraulically (underwater-) granulated plastic materials, in the form of a mixture of granulate and water on a curved sieve by means of an air current that flows in the direction in which the water passes through the sieve as well as along said sieve, while the mixture of granulate and water is fed to the curved sieve through a supply duct, is whirled by means of the kinetic energy of the air over the curved sieve, and is conveyed, at the end of the curved sieve, to an outlet passage.

A device of this type is known from the German Pat. No. 2 126 069. In that device, the mixture of water and granulate is conveyed, almost tangentially, by way of the supply channel, to the curved sieve, while an air supply zone follows that is connected with the end of the supply channel and covers a large area of the curved sieve; said air supply zone is constituted by the peripheral area of a ventilator. Due to the rotation of the ventilator in the direction of the flow of the mixture of water and granulate over the curved sieve, the air current along said zone has a transport component as well as—within the entire area of the zone—a radial component; in that way, the granulate is given a tendency largely to follow the curvature of the curved sieve. Then, the centrifugal force that appears during that process, brings about a flinging away of the water and its passage through the curved sieve.

The invention is basically concerned with the problem of increasing the effectiveness of the curved sieve while reducing, at the same time, the technical resources for the generation of the air current. In accordance with the invention, that is achieved by directing into the curved sieve an air jet that lies athwart it, for the generation of the air current, in such a way that the mixture of water and granulate which is carried along by the air current, hits the curved sieve at an angle of approximately 25° to 75°, and that, in the direction of the flow behind the air jet, a cover which covers the curved sieve, is adjacent to the rear wall of the air jet, and extends to the outlet passage, has been mounted in order to guide the granulate in a rebound movement ("Prallbewegung") shuttling between cover and curved sieve.

By means of the air current that is clustered closely by the air jet, the mixture of water and granulate is accelerated considerably and thrown onto the curved sieve, in the direction of the air current, in a direction that deviates considerably from the tangential direction, while at the same time, the larger part of the water immediately flows off, because of said direction of incidence. Because of the angle of incidence of the granulate, the granulate is thrown back by the curved sieve, so that, by way of interaction with the cover covering the curved sieve behind the air jet, a shuttling baffle movement results, in the course of which the water that still adheres to the granulate is thrown off the granulate, to a considerable extent. Then, the granulate leaves the curved sieve in a largely dehydrated condition.

The water that still adheres to the granulate after it has left the afore-mentioned curved sieve, may be removed by an additional, subsequent curved sieve. It is convenient to provide this additional curved sieve with an additional air jet for the supply of an air current.

If it is convenient, for reasons of space, to have the dry granulate leave the device at a certain height—e.g. 1 m—the two curved sieves are connected conveniently by means of an upward sloping conveyor duct.

It is advantageous to connect in series the curved sieves that are equipped with one air jet each, so as to form a multiple drier, while a covering that forms the cover in each case, extends over the jets and the curved sieves. In that way, the design of the covers is simplified considerably.

Figure 2:
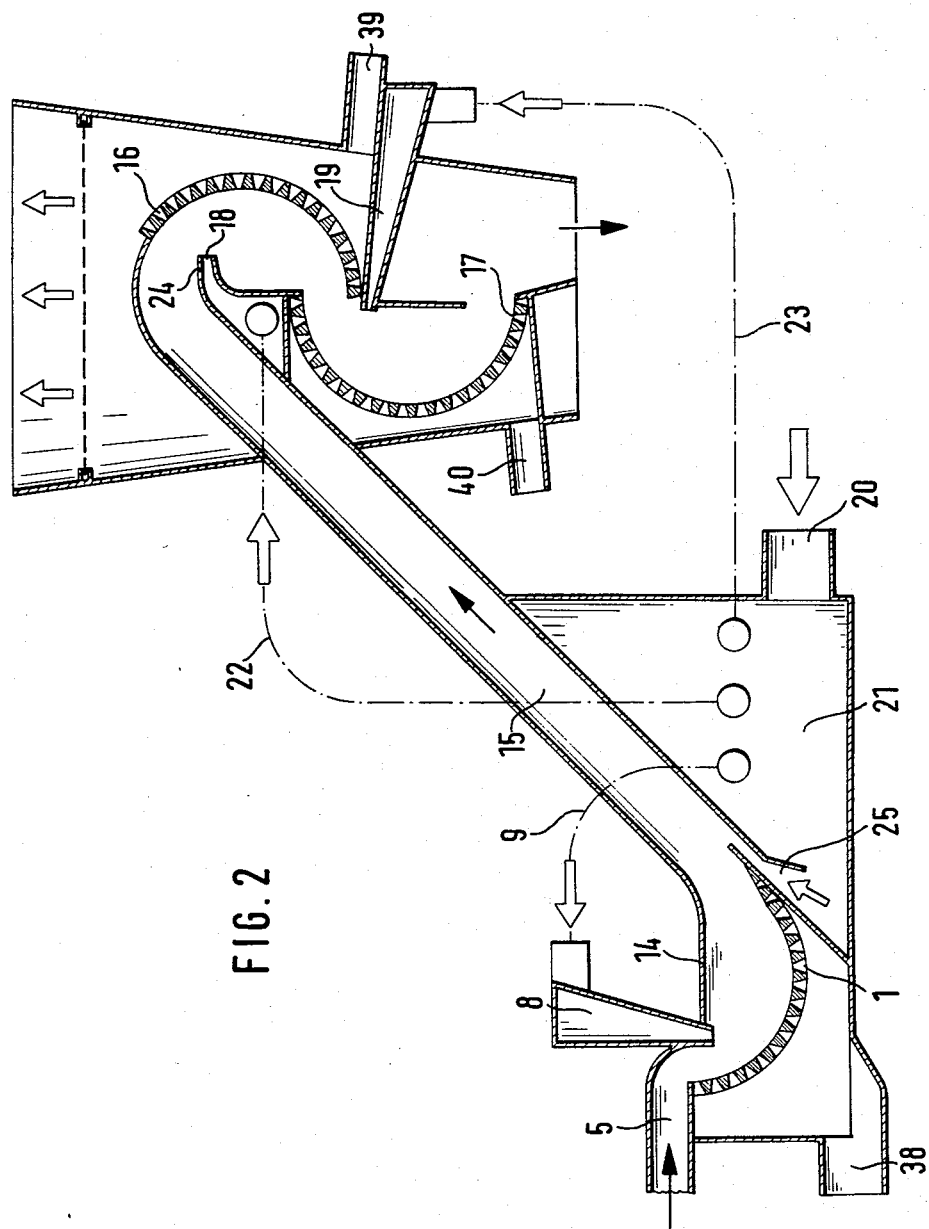
Figure 3:
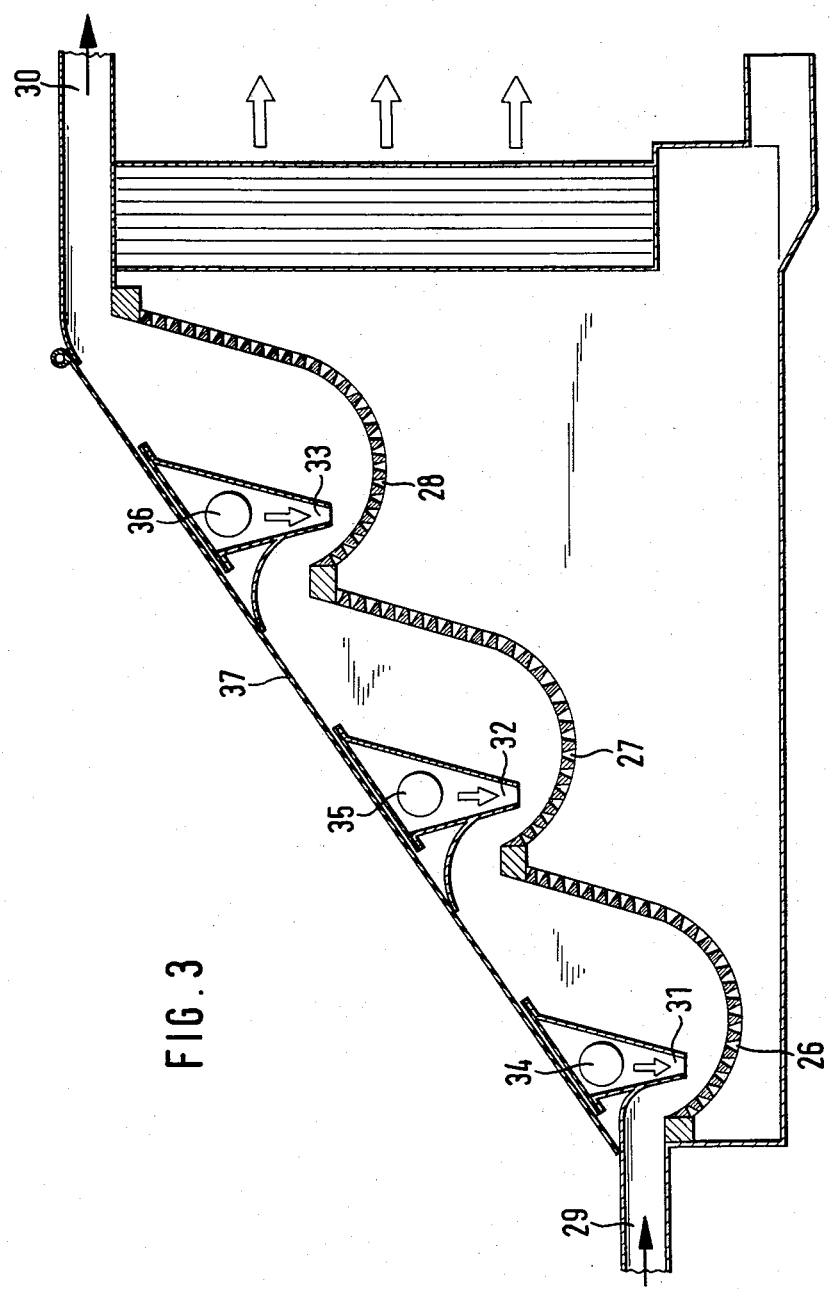
Figure 4:
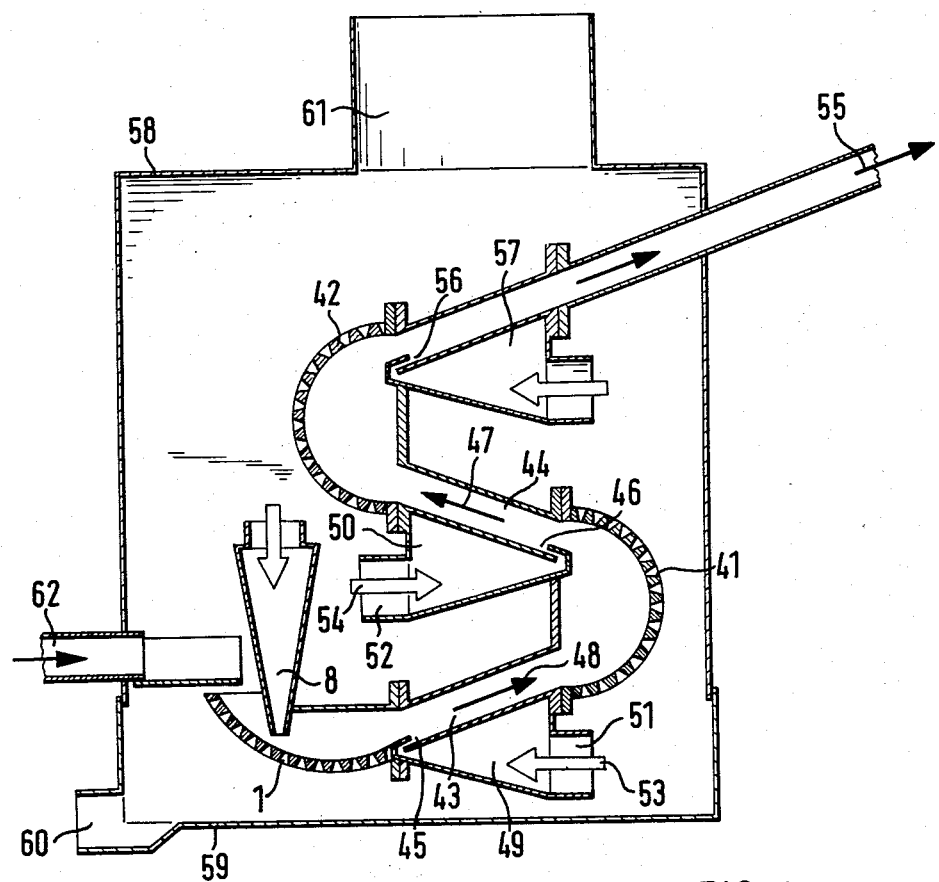

In the Figures, examples of the embodiment of the invention are shwon. They show in:

FIG. 1 a basic representation of a curved sieve with air jet and cover;

FIG. 2 a device with a total of three curved sieves and with an upward sloping conveyor duct;

FIG. 3 a device with three curved sieves that have been directly connected in series and with a common covering that constitutes the individual covers;

FIG. 4 a device with three curved sieves in a staggered arrangement and housed within a closed casing.

The device represented in FIG. 1 shows the curved sieve 1 that consists of parallel transverse rods 3 between which there are interspaces 4 which are used for the passage of the water that is to be removed. A curved sieve of this type is already known, e.g. from the German Pat. No. 2 126 069 which we mentioned at the outset. The faces of the individual transverse rods 3 are held—in a manner that is of no interest here—by casing plates which form a lateral wall, at the same time. The mixture of granulate and water is conveyed to the curved sieve 1 by way of the conveyor duct 5, the outlet opening of which is limited laterally by the front wall 7 of the air jet 8. The air jet 8 receives, by way of the hose 9, an air current that leaves at the mouth-piece 10 of the air jet 8 and, in the example of the embodiment of the invention as shown here, hits the curved sieve 1 at an angle of 30°, when said angle is measured between the central point of impact 11 of the air current 13 and the tangent 12 plotted on the curved sieve 1.

The mixture of granulate and water which leaves through the outlet 6, is accelerated by the air current 13 and strikes, in accordance with the direction—as drawn—of the air current 13, the curved sieve 1, while the important part of the water is removed through the curved sieve 1, due to the angle of impact of 30°. Due to the angle of impact, there results, in addition, a rebound effect for the granulate which rebounds from the rods 3 of the curved sieve 1 and is thrown against the cover 14. From there, it rebounds onto the curved sieve 1, so that, behind the impact side 11 along the curved sieve 1, a shuttling impact movement following the drawn zigzag-shaped dash-dotted line 41 will result until, at last, the granulate arrives at the end of the curved sieve 1 and enters the outlet passage 15 in which it is conveyed farther, due to the kinetic energy which it still possesses, until it arrives at a subsequent treatment site.

The rebound movement which is generated in the manner described above, sees to it that, after the first impact of the mixture of granulate and water on the curved sieve 1 within the region of the impact site 11, water that still adheres to the granulate, is thrown off and then passes through the interspaces 4 between the transverse rods 3. In that way, the granulate is almost free of water when it enters the outlet passage 15. The effect achieved in this device, viz. the throwing off of the water from the granulate, is achieved largely by the shuttling rebound movement which, in contrast to the conventional, more or less tangential sliding movement of the granulate over the curved sieve, takes place. It has been found that the throwing off of the water on the basis of the shuttling rebound movement is considerably more intensive than the more or less even conveying of the granulate along the inner surface of a curved sieve.

The cover 14 which is partly responsible for the rebound movement, extends from the rear wall 2 of the air jet 7 to the outlet passage 15 and sees to it that no granulate that rebounds from the curved sieve 1, may jump toward the outside.

In the device as shown in FIG. 2, three curved sieves 1, 16, and 17 are connected in series with the air jets 8, 18, and 19 respectively, while the upward sloping delivery channel 15 is inserted between the curved sieves 1 and 16. In this device, the air supply takes place by way of the air inlet 20 that supplies the air to a distributing container 21 out of which the air supply hoses 9, 22, and 23 branch off. The air jets 8, 18, and 19 are supplied with air by way of those air supply hoses 9, 22, and 23.

All three curved sieves 1, 16, and 17 act in the manner as described in connection with FIG. 1 so that, consequently, the afore-mentioned rebound movement of the granulate is developed in these three curved sieves. In that way, an especially intensive dehumidification of the granulate is achieved by this device. In addition, it should be pointed out that the air jet 18 has been positioned, in such a way that its front wall changes over into the delivery channel 15, so that any water that creeps up in the delivery channel 15 has to flow over the front wall 24 and, in that way, arrives in the air current that leaves the air jet 18. Thus, it is possible to remove that water through the curved sieve 16.

The water removed by means of the curved sieves 1, 16, and 17 emerges by way of the water outlets 38, 39, and 40. The air supply to the pneumatic delivery channel 15 takes place at the end of the curved sieve 1 by means of the air inlet nozzle 25, which the air leaves in a sloping upward direction and moves the granulate that has been conveyed to the delivery channel 15, in an upward direction—following the direction of the arrow drawn in the delivery channel—to the curved sieve 16.

In FIG. 3, a device is shown in which the three curved sieves 26, 27, and 28 are directly connected in series, with a transport component that is directed slopingly upward, so that the mixture of granulate and water supplied by way of the supply channel 29, emerges on the outlet connection at a level that is approximately 1 m higher. The three curved sieves 26, 27, and 28 are connected with the air jets 31, 32, and 33, respectively, which—in accordance with the representation chosen here—are provided with air individually by way of the sockets 34, 35, and 36. Above the three air jets 31, 32, and 33, the covering 37 has been provided which extends over all curved sieves 26, 27, and 28 and, in doing so, forms the respective cover for each curved sieve. In the region of each curved sieve 26, 27, and 28, there will then develop, due to the action of the air leaving the air jets 31, 32, and 33, the shuttling rebound movement of the granulate, so that here, too, a particularly intensive dehumidifying of the granulate will be the result.

In the device shown in FIG. 4, two additional curved sieves, viz. the curved sieves 41 and 42, are connected at the outlet of the curved sieve 1 that has been equipped with the air jet 8. The connection between curved sieve 1 and curved sieve 41 is established by way of the delivery channel 43, and the connection between curved sieve 41 and curved sieve 42 takes place by way of the delivery channel 44. The air inlet nozzles 45 and 46 which extend athwart the delivery channels 43 and 44 respectively, are mounted on the lower ends of said two delivery channels 43 and 44 respectively; said air inlet nozzles generate an upward sloping air current in the respective delivery channel, said air current being indicated by the arrows 47 and 48. By means of those air currents 47 and 48 the granulate that has been supplied to the delivery channels 43 and 44, respectively, is moved upward. Below each of the two delivery channels 43 and 44, air distributor boxes 49 and 50 have been provided, to which the respective air current is supplied by way of the air inlet openings 51 and 52, said air current having been indicated by the arrows 53 and 54. As may be seen, the direction of the air currents 53 and 54 is such that they take their course perpendicularly to the transverse direction of the delivery channels 43 and 44, so that, even under the action of the air distributor boxes 49 and 50, there will result largely an air current within the air distributor boxes 49 and 50 that is directed symmetrically toward the air inlet nozzles 45 and 46. In consequence thereof, the air from the air inllet nozzles 45 and 46 over their lengths largely at the same velocity, so that the granulate moved in the conveying ducts 43 and 44 will be accelerated uniformly over the entire width of said conveying ducts 43 and 44. The arrangement of the air distributor boxes 49 and 50 sees to it that the air flow within this region will take place by means of one deflection only, viz. directly in front of the air inlet nozzles 45 and 46, so that the losses of power will be relatively small.

An additional, upward-sloping conveying duct 55 is connected at the outlet of the curved sieve 42; in the same way as the conveyor ducts 43 and 44, it has been provided, on its lower end, with an air inlet nozzle 56, which extends athwart it and which receives its air current by way of the air distributor case 57. The granulate that has been moved through the device, is removed by way of the delivery channel 55. E.g., it may be moved directly to the containers of deposit, but it is possible also to connect an arrangement of curved sieves with the delivery channel 55, in a manner similar to the way in which it is—in accordance with FIG. 2—connected to the outlet of the conveying duct 15.

The arrangement of the curved sieves 1, 41, and 42 with the conveying ducts 43, 44, and 45 is housed in a casing 58, the bottom 59 of which is used as a collective container of the water eliminated by the device. The water outlet 60 has been provided in the bottom 59. In addition, the casing 58 has been provided with an air outlet 61 through which the air that passes through the curved sieves 1, 41, and 42, emerges. The casing has been designed as a sound-proofing hood; to that end, its inner walls have been provided with sound absorbing and/or sound proofing material. The granulate inlet 62 which, in a way similar to the representation in FIG. 1, extends to the beginning of the curved sieve 1, and from which the granulate falls down onto the curved sieve 1, leads into the casing 58.

We claim:

1. A device for the dehydration and drying of solids from a mixture of solids and water, said device comprising:

a curved sieve;

supply means for supplying the mixture of solids and water to the sieve;

air jet inlet means spaced from the sieve and positioned adjacent to the supply means for producing an accelerated air current in the direction of the sieve, said air current defining an angle of incidence with the sieve, said angle being defined between the central point of impact of the air current on the sieve and the tangent to the sieve at the central point of impact, wherein the mixture is propelled against the sieve by the air current at the angle of incidence to force water through the sieve and to bounce the solids against the sieve, said angle of incidence being between 25° and 75°;

a mouthpiece opening defined by said air jet inlet means, said air current passing through said opening to the sieve;

a flat cover plate spaced from the sieve, one end of said cover plate being positioned adjacent to said air jet inlet means, said opening being spaced from said cover plate, said cover plate positioned to receive solids being bounced from the sieve by the air current and to have the solids bounce from the cover plate to the sieve; and an outlet means for receiving solids bounced from the sieve after having been bounced from the cover plate, said outlet means being positioned adjacent to the other end of the cover plate whereby the solids being bounced by the air current from the sieve to the cover plate, from the cover plate to the sieve and from the sieve to the outlet means throw off water.

2. The device in accordance with claim 1, wherein an additional curved sieve is connected at the outlet side of the curved sieve.

3. The device in accordance with claim 2, wherein the additional curved sieve is equipped with an additional air jet inlet means.

4. The device in accordance with claim 2 or 3, wherein the two curved sieves are connected by means of a conveyor duct that slopes upward.

5. The device in accordance with claim 1, wherein several additional curved sieves are each equipped with an air jet inlet means and are connected in series so as to form a multiple drier, while a covering extends over all the jets and all the curved sieves.

6. The device in accordance with claim 1, wherein two additional curved sieves are connected in series with the curved sieve, the connections between the sieves being established by means of conveyor ducts that slope upward, in a staggered arrangement.

7. The device in accordance with claim 6, wherein the lower end of each conveyor duct is provided with an air inlet nozzle extending across each said conveyor duct and an air current is supplied perpendicularly to the cross direction of each air inlet nozzle.

8. The device in accordance with claim 6, wherein all the curved sieves and the conveyor ducts are housed in a casing, the bottom of the casing being used as a collecting basin for water, the casing having a water outlet at the bottom, and the upper part of the casing being provided with an air outlet.

9. The device in accordance with claim 8, wherein the casing is a sound-proofing hood.

10. A device as claimed in claim 1, wherein the angle of incidence is 30°.

11. A device as claimed in claim 1, wherein said supply means is limited laterally in a direction towards said outlet means by said air jet means.

12. A device as claimed in claim 1, wherein the outlet means is positioned adjacent to the sieve.

* * * * *